United States Patent
Koyama et al.

[11] Patent Number: 5,839,808
[45] Date of Patent: Nov. 24, 1998

[54] PROJECTION OPTICAL SYSTEM

[75] Inventors: Motoo Koyama, Kawasaki; Yuji Manabe, Kamakura; Ikuo Mori, Kawasaki, all of Japan

[73] Assignees: Nikon Corporation; Nippon Hoso Kyoki, both of Tokyo, Japan

[21] Appl. No.: 687,890

[22] Filed: Jul. 26, 1996

Related U.S. Application Data

[63] Continuation-in-part of Ser. No. 535,629, Sep. 28, 1995, abandoned.

[30] Foreign Application Priority Data

Sep. 28, 1994 [JP] Japan ................................. 6-257281

[51] Int. Cl.$^6$ .................................................. G03B 21/28
[52] U.S. Cl. ................................................ 353/97; 353/98
[58] Field of Search .................................. 353/37, 82, 97, 353/98, 99

[56] References Cited

U.S. PATENT DOCUMENTS

| | | | |
|---|---|---|---|
| 3,704,936 | 12/1972 | Gorkiewicz et al. | 353/69 |
| 3,886,310 | 5/1975 | Guldberg et al. | 315/374 |
| 4,389,096 | 6/1983 | Hori et al. | |
| 5,108,172 | 4/1992 | Flasck | 353/37 |
| 5,231,433 | 7/1993 | Yoshida et al. | 353/37 |
| 5,239,322 | 8/1993 | Takanashi et al. | 353/31 |
| 5,245,369 | 9/1993 | Um et al. | 353/37 |
| 5,260,815 | 11/1993 | Takizawa | 359/41 |
| 5,398,081 | 3/1995 | Jones | 359/40 |
| 5,486,881 | 1/1996 | Hwang | 353/37 |
| 5,555,041 | 9/1996 | Manabe | 353/98 |

FOREIGN PATENT DOCUMENTS

| | | |
|---|---|---|
| 54-111846 | 1/1979 | Japan . |
| 4-319910A | 11/1992 | Japan . |
| 6-265842A | 9/1994 | Japan . |

*Primary Examiner*—William Dowling
*Attorney, Agent, or Firm*—Klarquist Sparkman Campbell Leigh & Whinston, LLP

[57] ABSTRACT

A projection system is disclosed including a light source for producing an illumination light flux, and a light valve for converting the illumination light flux incident on the light valve into a modulated light flux. The projection system also includes a front lens system having a front optical axis. The front lens system is disposed relative to the light source and the light valve to transmit the illumination light flux to the light valve, and to transmit the modulated light flux toward a rear lens system having a rear optical axis that is displaced from but parallel to the front optical axis. The rear lens system is disposed relative to the front lens system to transmit the modulated light flux from the front lens system onto a suitable surface for viewing.

15 Claims, 3 Drawing Sheets

PROJECTION OPTICAL SYSTEM

CROSS REFERENCE TO RELATED APPLICATION

This application is a continuation-in-part of U.S. patent application Ser. No. 08/535,629, filed on Sep. 28, 1995 and now abandonded.

FIELD OF THE INVENTION

This invention generally relates to projection optical systems, and more particularly to projection optical systems using light valves.

BACKGROUND OF THE INVENTION

Video projectors for projecting a picture image on a relatively large viewing screen, such as movie projectors, have been popular for years. More recently, advances in optics technology have produced video and still-image projectors utilizing devices known as light valves. Light-valve projection systems offer tremendous potential in business, military, and entertainment applications due to their versatility and high quality imaging.

In general, a light-valve projection system includes a light-valve surface that can be modulated by an electronic or optical input to form informational patterns. An "optical system" (e.g., lens assembly) refracts an "illumination light flux" for impingement on the light-valve surface. The light-valve surface spatially modulates the illumination light flux and produces a "modulated light flux." The optical system then refracts and focuses the modulated light flux for display on a suitable surface, such as a projection screen, that produces an image corresponding to the informational pattern.

One of the main goals of light-valve projection-system design is the achievement of a high "optical efficiency," which is generally defined as the brightness of an image produced by a given light-source intensity. Conventional light-valve projection systems have less than completely satisfactory optical efficiencies.

For instance, one type of light-valve system uses a light valve utilizing a phase-shifting birefringent liquid crystal material, a polarized-light optical system, and a polarized specular illumination light source. These polarized systems tend to have a low optical efficiency because much of the original illumination light brightness is lost in polarization.

Another common type of light-valve system is a "diffusion" light-valve system. Diffusion light-valve systems utilize a light valve that, according to an informational pattern formed on the light-valve surface, selectively reflects incident light and selectively diffuses incident illumination light by diffraction.

One specific type of diffusion light-valve system known in the art projects diffused light for image formation, while blocking the reflected light with an optical stop. A diffusion light valve of such construction is shown in U.S. Pat. No. 3,886,310 to Guldberg et al. The light valve is formed of an array of microfabricated, electronically deflectable, reflective valve surfaces, which are known in the art as "cloverleaf" or "cantilever-type" valves. A scanning electron beam selectively deflects certain valve surfaces to create an informational pattern on the light valve. Undeflected valve surfaces uniformly reflect incident illumination light flux, which is concentrated in a cone by an optical system and prevented from reaching the projection screen by an optical stop with a central obscuration. Deflected valve surfaces appropriately diffuse the illumination light flux by diffraction for passage by the optical stop. Optics are provided to project the diffused light on a projection screen to form an image corresponding to the informational pattern.

Another type of diffusion light valve known in the art uses a thin reflective membrane which is mounted over a support grid structure on a screen faceplate. Charges selectively deposited on the faceplate electrostatically attract the membrane so as to cause corresponding portions of the membrane to sag toward the grid structure, thereby forming a plurality of miniature spherical mirrors in an informational pattern. Illumination light incident on unmodulated portions of the light-valve surface is uniformly reflected, and is likewise condensed in a cone shape and stopped by an optical stop with a central obscuration. The spherical mirrors diffuse illumination light by diffraction, which is then passed by the stop and projected upon a projection screen.

Other diffusion-type light valves using light-diffusing electro-optical crystals, such as polymer-dispersion liquid crystals, have also been combined with optical systems to form images with light diffused from the light valve.

While the foregoing diffusion light-valve systems generally form high quality images, they have the disadvantage of a relatively low optical efficiency. In particular, the optical blocking of the uniformly reflected light tends to waste an unacceptably large proportion of the original illumination light flux.

To avoid such low optical efficiency, another type of diffusion light-valve system has been developed. This type is similar in certain respects to other diffusion light-valve systems described above, but is distinctive because it uses uniformly reflected light from unmodulated areas of the light-valve surface to form an image, and optically blocks the diffused light flux. To pass the uniformly reflected light flux, such reflected light flux is concentrated in a cone and passed through an aperture defined by an aperture stop. The diffused light is blocked by the aperture stop.

Diffusion light-valve systems using reflected light for image formation have excellent optical efficiencies. However, passing light flux that has been uniformly reflected by the light valve to a projection screen necessitates, according to the prior art, superposition of the optics for projecting the illumination light flux onto the light valve with the optics for projecting the light flux reflected by the light valve onto the projection screen. As will next be discussed, conventional optical systems applied to such diffusion light valves to avoid such superposition tend to introduce troublesome levels of aberrations into the image production.

Figure 1:
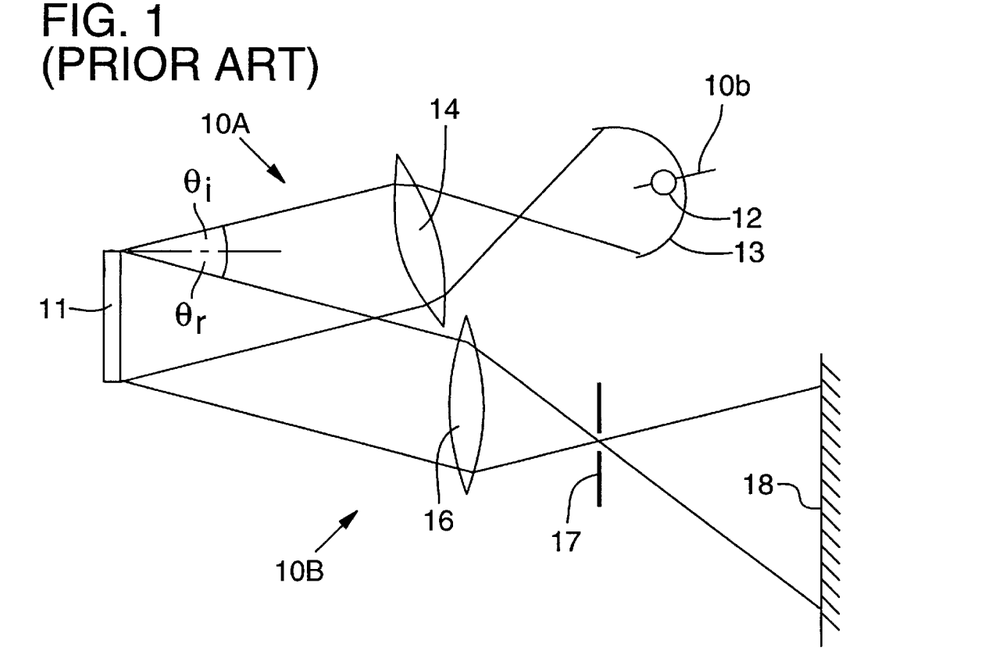
FIG. 1 is an optical diagram of a prior-art light-valve projection device using a conventional optical system.

An example of such a diffusion light-valve projection system as known in the art is shown in FIG. 1. In this system, an illumination optical system 10A and a projection optical system 10B are oriented to form substantially diverging incident and reflective light flux angles $\theta_i$, $\theta_r$, respectively, relative to a light valve 11 so as to avoid superposition of the illumination and projection optical systems. The illumination optical system 10A includes a light source 12 nested within an ellipsoidal mirror 13, and a condenser lens system 14 disposed on an illumination optical axis 10b. The projection optical system 10B includes the projection lens system 16 and the aperture stop 17 which are disposed to receive the modulated light flux reflected from the light valve 11. The modulated light flux impinges on a projection screen 18 for display and viewing.

During operation, the light source 12 emits the illumination light flux, which is reflected by the ellipsoidal mirror 13 to the condenser lens system 14. The condenser lens system 14 substantially collimates the illumination light flux and directs the light flux at the incident angle $\theta_i$ on the light valve 11. The illumination light flux is spatially modulated by the light valve 11 and is reflected at the reflective angle $\theta_r$ to the projection lens system 16. The projection lens system 16 converges the reflected modulated light flux at the aperture stop 17. The aperture stop 17 blocks light that is selectively diffused by the light valve 11 from reaching the projection screen 18, so as to form a sharp image on the projection screen 18. While the diverging angled orientations of the illumination and projection optical systems avoid superposition interference between the illumination and projection optical systems, the substantial angles of incidence and reflection $\theta_i$, $\theta_r$, respectively, at the light valve 11 yield an unacceptably distorted image at the projection screen 18.

Figure 2:
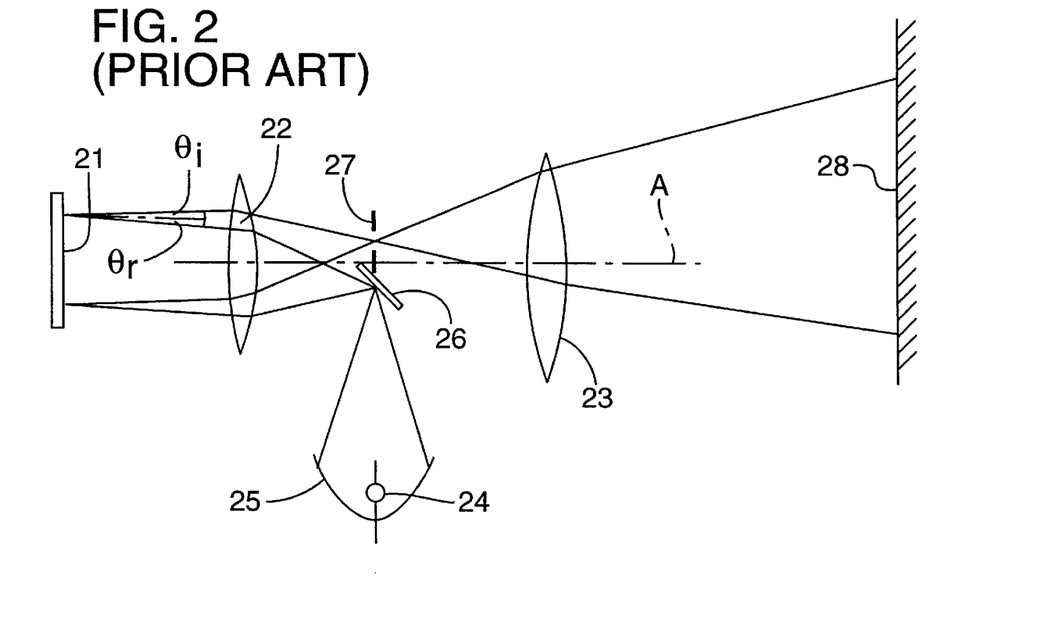
FIG. 2 is an optical diagram of another prior-art light-valve projection device using a conventional optical system.

To lessen such distortion, light-valve projection systems such as that shown in FIG. 2 represent an attempt in the prior art to minimize the incident and reflective angles $\theta_i$, $\theta_r$, respectively, of the light flux relative to the light-valve screen 21. To minimize the incident and reflective angles while avoiding superposition of illumination and projection system optics, a front condenser lens system 22 and a rear projection lens system 23 are disposed on an optical axis A that is perpendicular to the light valve 21. A light source 24 nested in an ellipsoidal mirror 25 is positioned laterally below and oriented toward the optical axis A. A mirror 26, preferably planar, is disposed in registration with the ellipsoidal mirror 25 laterally slightly below the optical axis A, and at about a 45° angle relative to the optical axis A. The front lens system 22 is disposed between the light valve 21 and the mirror 26. An aperture stop 27 is disposed symmetrically across the optical axis A from the mirror 26. The rear projection lens system 23 is disposed between the aperture stop 27 and a projection screen 28.

During operation of the FIG. 2 device, an illumination light flux emitted by the light source 24 is condensed by the ellipsoidal mirror 25 to a point on the mirror 26. The mirror 26 reflects the diverging illumination light flux to the front lens system 22 which substantially collimates the light flux and directs the light flux to the light valve 21 at the incident angle $\theta_i$ which is substantially perpendicular to the light valve 21. The illumination light flux is spatially modulated and reflected by the light valve at the symmetric reflective angle $\theta_r$ that is also substantially perpendicular to the light valve 21. The modulated light flux passes back through the front lens system 22 which converges the modulated light at the aperture stop 27. The aperture stop 27 blocks unwanted diffuse light and passes divergent reflected modulated light toward the rear lens system 23 through which the modulated light passes substantially off-axis. The reflected modulated light is thus projected onto the projection screen 28 for viewing.

The coaxially disposed front and rear lens systems 22, 23, respectively, avoid unacceptable levels of distortion by providing narrowly divergent incident and reflective angles $\theta_i$, $\theta_r$, respectively, at the light valve. However, transmission of the reflected modulated light through the off-axis portion of the rear lens system 23 causes the formation of unacceptable asymmetrical aberrations such as coma. Also, because the optical characteristics of spherical lenses are often unreliable near the lens periphery, unacceptable image degradation known as "edge effects" can arise from transmitting modulated light flux off-axis through peripheral regions of the rear lens system 23. While an additional stop could be positioned adjacent the rear lens system 23 to block extreme off-axis portions of the modulated light flux so as to minimize coma and edge effects, the additional stop unfortunately also would decrease image brightness. Furthermore, while relatively large-diameter lenses may be provided in the projection lens system to control edge effects, large-diameter lenses would add to the size, weight, and expense of the projection device.

Therefore, there is a need for a projection device of simple construction, low cost, and modest size and weight that avoids unacceptable levels of aberrations such as distortion, coma, and edge effects.

SUMMARY OF THE INVENTION

The present invention satisfies the foregoing need by providing a compact, simply constructed light-valve projection system capable of forming a high-quality projected image without undesirable levels of distortion, coma, and other optical aberrations.

According to one aspect of the present invention, a light-valve projection system is provided that projects an illumination light flux onto a light valve at a very small angle of incidence.

According to another aspect of the present invention, the light-valve projection system is operable to produce an image on a suitable viewing surface, such as a projection screen, the image having substantially uniform radial light intensity and contrast.

According to yet another aspect of the present invention, the light-valve projection system comprises lenses of relatively small diameter, thereby substantially reducing cost, weight, and bulk of the system.

According to a preferred embodiment of the invention, the projection system comprises a light source, a light valve, a front lens system, a rear lens system, and a stop defining an aperture. The front lens system is situated between the light source and the light valve and between the light valve and the aperture. The rear lens system is situated between the aperture and a suitable surface, such as a projection screen, on which modulated light flux can form a viewable image. The front and rear lens systems have front and rear optical axes, respectively, that are preferably parallel to each other and the aperture is preferably coaxial with the rear optical axis.

Further according to the preferred embodiment, the light source is operable to produce an illumination light flux and to form, from the illumination light flux, a light-source image between the light source and the front lens system. The front lens system refracts the illumination light flux, diverging from the light-source image, to be incident preferably as substantially collimated rays, on the light valve at an angle of incidence $\theta_i$. Modulated light flux produced by the light valve from the incident illumination light flux propagates, preferably as substantially parallel rays, at a reflectance angle $\theta_r = \theta_i$, wherein $\theta_r$ and $\theta_i$ are preferably small. The front lens system refracts the modulated light flux to converge at the aperture. Thus, the aperture and the light-source image are preferably located on a focal surface of the front lens group. From the aperture, the modulated light flux divergently propagates to the rear lens system that directs the modulated light flux to a suitable surface, such as a projection screen, on which the modulated light flux can form a viewable image.

As stated above, the aperture and the light-source image are preferably situated on a focal surface of the front lens system. According to certain embodiments, the aperture and the light-source image are specifically situated on an axis (termed herein a "central axis") that is orthogonal to the front and rear optical axes. The aperture is operable to pass therethrough reflected portions of the modulated light flux while blocking unwanted diffused light.

The light source preferably includes an intense point source of light and an ellipsoidal mirror or analogous component (generally referred to herein as an "ellipsoidal mirror") that converges the illumination light flux to form a point light-source image.

In a first representative example of the preferred embodiment, the light source is situated on the central axis and forms the light-source image on the central axis. A mirror, preferably planar, is situated at the light-source image to reflect the illumination light flux through the front lens system to the light valve.

According to a second representative example of the preferred embodiment, a mirror (preferably planar) is situated downstream of the aperture to reflect the modulated light flux diverging from the aperture to the rear optical system. In this second representative example, the illumination light flux is not reflected as in the first representative embodiment, but rather propagates directly from the light source through the front lens system to the light valve.

DETAILED DESCRIPTION

Figure 3:
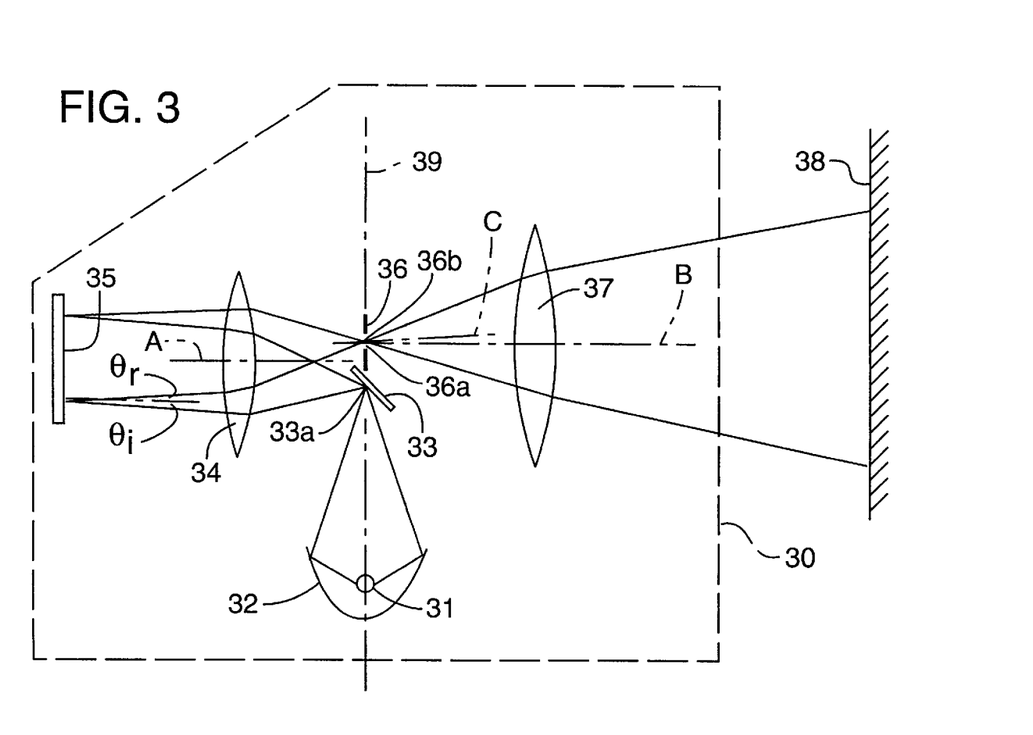
FIG. 3 is an optical diagram of a light-valve projection system according a first representative example of a preferred embodiment of the present invention.

FIG. 3 depicts general features of a preferred embodiment of a projection system 30 according to the present invention, as well as specific aspects of the first representative example of the preferred embodiment. The system 30 generally comprises an illumination source 31, an ellipsoidal mirror 32, a front lens system 34, a light valve 35, a stop 36, and a rear lens system 37. The stop 36 defines an aperture 36a.

Also shown in FIG. 3 is a "projection screen" 38 usable with a projection system 30 according to the present invention. As used herein, the term "projection screen" refers generally to any suitable surface on which a projected image can be viewed; the term is not limited to conventional projection screens, and can encompass, for example, a wall or ceiling of a dwelling.

FIG. 3 also depicts a "central" axis 39. The illumination source 31, the stop 36, and the aperture 36a, inter alia, are situated on the central axis 39.

Further with respect to FIG. 3, the ellipsoidal mirror 32 is oriented so as to reflect light from the illumination source 31 along the central axis 39. The illumination source 31 is preferably a substantially point source of high-intensity specular light. The illumination source 31 is nested inside the ellipsoidal mirror 32 at a first focal point of the ellipsoidal mirror 32. The ellipsoidal mirror 32 converges the illumination light flux, produced by the illumination source 31, at a second focal point 33a of the ellipsoidal mirror 32. Thus, the second focal point 33a is where the light-source image is formed. As can be seen in FIG. 3, the second focal point 33a (i.e., the light-source image) is on the central axis 39.

FIG. 3 also indicates that the front lens system 34 has an illumination-side focal point that is at the same location as the second focal point 33a of the ellipsoidal mirror 32. As a result, the illumination-side focal point shown in FIG. 3, the second focal point of the ellipsoidal mirror 32, and the light-source image are all designated herein as item 33a.

A mirror 33 (preferably planar) is oriented with respect to the central axis 39 such that the light-source image forms on the mirror 33 and is reflected as a diverging illumination light flux through the front lens system 34 to impinge on the light valve 35 at a small incidence angle $\theta_i$. Thus, the mirror 33 is oriented, on an axis perpendicular to the plane of the figure, at an angle that is slightly less than 45° counterclockwise relative to the central axis 39.

The front lens system 34 is a condenser-type lens system having a front optical axis A (preferably extending perpendicularly through the center of the light valve 35) that is substantially perpendicular to the central axis 39. The front lens system 34 substantially collimates the illumination light flux for impingement on the light valve 35.

The light valve 35 produces, from the incident light flux, a modulated light flux that propagates from the light valve at an angle of reflection $\theta_r = \theta_i$. The modulated light flux propagates from the light valve 35 as substantially parallel rays that are converged by the front lens system 34 at a focal point 36b on the central axis 39. The aperture 36a is concentric with the focal point 36b.

In view of the convergence of the illumination light flux and the modulated light flux on the central axis 39, it will be readily apparent that at least the portion of the central axis 39 between and including the focal points 33a and 36b represents a focal surface of the front lens system 34, and that both the light-source image 33a and the aperture 36a are situated on the focal surface.

The rear lens system 37 is a projection-type lens system that is situated rearwardly (toward the screen 38) of the central axis 39 on a rear optical axis B that is parallel to the front optical axis A. As shown in FIG. 3, the screen-side focal point 36b of the front lens system 34 is also the illumination-side focal point of the rear lens system 37. Modulated light flux propagating through the rear lens system 37 has an axis C that passes through the aperture 36a at the screen-side focal point 36b. The axis C is oriented at the angle $\theta_r$ relative to the rear optical axis B.

The focal points 33a, 36b are preferably situated symmetrically on opposing sides of the front optical axis A, preferably as close to each other as possible while avoiding superposition of the mirror 33 and the stop 36 that would interfere with their function, as discussed below. Thus, in FIG. 3, the stop 36 and the mirror 33 can contact each other, or constitute corresponding portions of a single structure (not shown).

During operation of the FIG. 3 embodiment, light flux generated by the illumination source 31 is reflected by the ellipsoidal mirror 32 for convergence on the mirror 33 at the second focal point 33a of the ellipsoidal mirror 32. The slightly less than 45° angle of the mirror 33 relative to the central axis 39 effects reflection of illumination light flux, diverging from the second focal point 33a, toward an eccentric region of the front lens system 34 that includes the central region of the front lens system 34.

The front lens system 34 substantially collimates the illumination light flux into a beam of uniform intensity that is incident on the light valve 35. In FIG. 3, because the focal point 33a is laterally displaced slightly relative to the front optical axis A, the substantially colliminated illumination light flux impinges on the light valve 35 at a small incident angle $\theta_i$. Since the incident angle $\theta_i$ is preferably as small as possible, most of the illumination light flux passes through substantially the central region of the front lens system 34, thereby maintaining aberrations such as coma at a negligible level. Preferably, the incident angle $\theta_i$ is less than 10 degrees.

The light valve 35 simultaneously spatially modulates and reflects the incident illumination light flux. Modulation, according to electronic signals input to the light valve, occurs by separation of the incident illumination light flux into a uniformly reflected modulated light flux exploited for image formation, and a diffused light flux formed by diffraction that is preferably blocked from the projection screen.

The modulated light flux reflected by the light valve 35 propagates back through the front lens system 34 at a reflection angle $\theta_r$. Much of the modulated light flux passes through a substantially central (i.e., axial) region of the front lens system 34, thereby reducing aberrations such as coma to negligible levels.

Refraction of the substantially collimated modulated light flux by the front lens system 34 converges the modulated light flux at the screen-side focal point 36b. The stop 36 substantially blocks diffused light in the modulated light flux. Reflected modulated light flux passes through the aperture 36a and diverges toward the rear lens system 37. Much of the modulated light flux passes through a substantially central (i.e., axial) region of the rear lens system 37 for impingement on a suitable surface (such as a projection screen 38) for viewing. The rear lens system 37 decreases the angle of divergence of the modulated light flux as appropriate to fill the screen 38 or other viewing surface.

Because the light-source image and the stop 36 are located on the illumination-side focal surface of the front lens system 34, the light valve 35 is illuminated with a uniform light distribution. Thus, an image on the screen 38 is permitted to have a uniform light distribution and contrast from image center to image periphery.

Because the screen-side focal point 36b is located on the optical axis B, much of the diverging modulated light flux passes through a substantially central region of the rear lens system 37, at which region the optical characteristics of individual lens elements in the rear lens system 37 are most dependable. Thus, unacceptable levels of edge effects are avoided. Whereas the axis C of the reflected modulated light flux is at an angle ($\theta_r$) relative to the rear optical axis B, the angle $\theta_r$ is sufficiently small that levels of any asymmetric aberrations such as coma imparted by the rear lens system 37 do not reach troublesome levels.

Coma can be further avoided by superimposing the optical axis B with the axis C. In such an instance, the projection screen 38 (or other suitable viewing surface) is preferably oriented such that the rear optical axis B is perpendicular to the projection screen 38. Such perpendicularity avoids any significant image distortion.

In any event, propagation of much of the reflected modulated light flux through a substantially central region of the rear lens system 37 is further advantageous because lens element(s) used in the rear lens system 37 can be kept relatively small in diameter. Small-diameter lens elements desirably yield a less expensive and lower-weight light-valve projection system.

It is also noteworthy that the present invention provides for easier system assembly, since the optical axes A, B need not be coaxially aligned.

Figure 4:
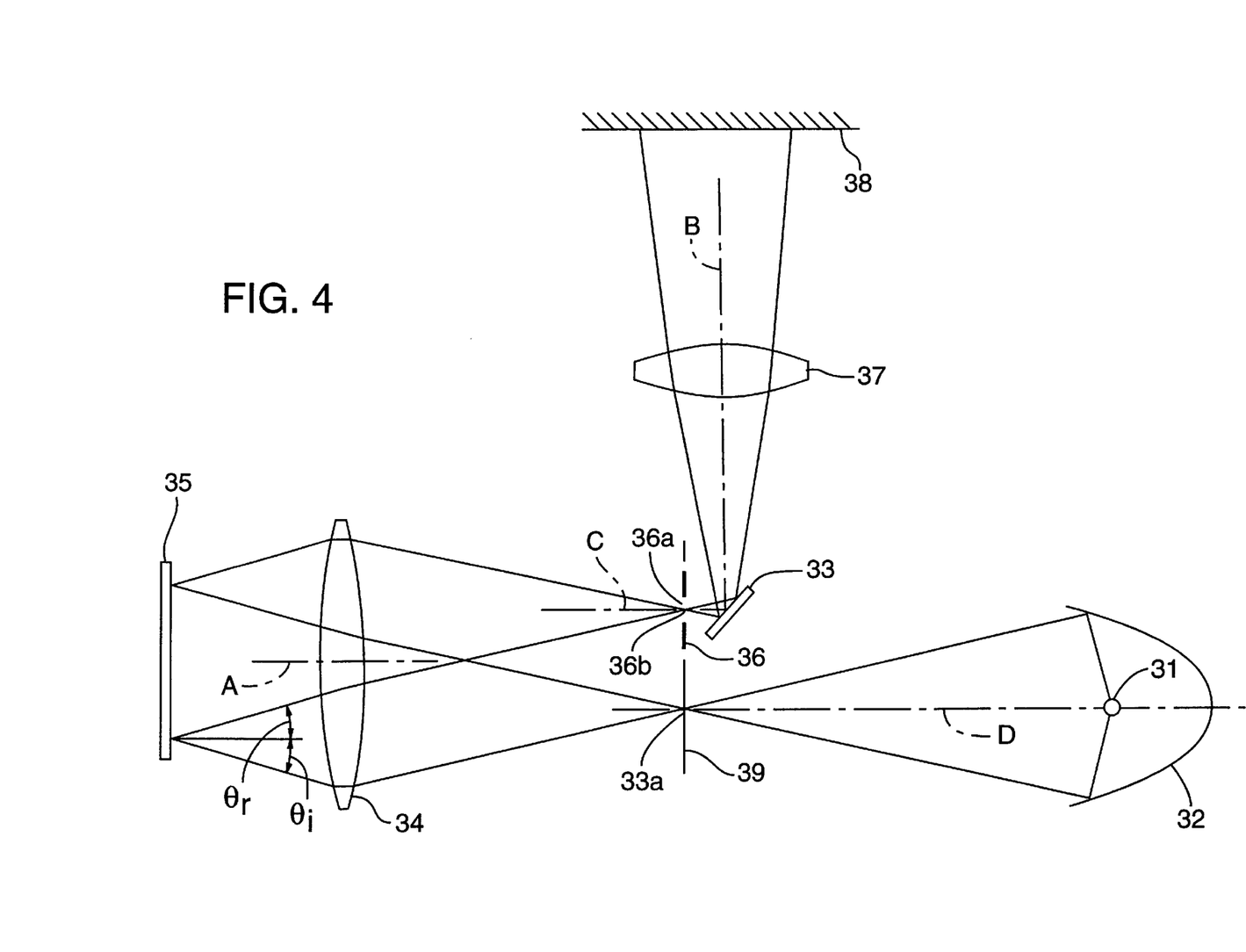
FIG. 4 is an optical diagram of a light-valve projection system according to a second representative example of the preferred embodiment.

A second representative example, as shown in FIG. 4, of a projection system according to the preferred embodiment comprises all the components shown in FIG. 3, but the disposition of certain components relative to each other is altered from the arrangement shown in FIG. 3. In FIG. 4, the components have the same reference designators as corresponding components shown in FIG. 3.

In FIG. 4, the illumination source 31 is situated at the primary focal point of the ellipsoidal mirror 32. An image of the illumination source 31 is formed at a second focal point 33a, located on an illumination axis D, of the ellipsoidal mirror 32. Diverging illumination light flux from the focal point 33a is refracted by an eccentric area of the front lens system 34. The front lens system 34 is situated such that the focal point 33a is also an illumination-side focal point, on the light axis D, of the front lens system 34. (Thus, item 33a designates both the second focal point of the ellipsoidal mirror 32 and an illumination-side focal point of the front lens system 34.) The front lens system 34 substantially collimates the incident light flux for impingement on the light valve 35 at a (preferably) small angle of incidence $\theta_i$.

The front lens system 34 has a front optical axis A that is perpendicular to and passes through the center of the light valve 35. Illumination light flux is reflected from the light valve as a modulated light flux at an angle $\theta_r$ relative to the front optical axis A.

The modulated light flux is refracted again by passage through an eccentric region of the front lens system 34. The modulated light flux then converges at the screen-side focal point 36b of the front lens system 34 (which focal point is also the illumination-side focal point of the rear lens system 37). An aperture 36a, defined by a stop 36, is disposed concentrically at the focal point 36b. The focal point 36b is the same distance from the front lens system 34 as the light-source image 33a. This distance is indicated by a line 39 representing a focal surface of the front lens system 34. As can be seen in FIG. 4, both the light-source image 33a and the aperture 36a are situated on the focal surface 39. Also, as seen in FIG. 4, the focal points 33a, 36b are effectively symmetrically situated on opposing sides of the front optical axis A.

The stop 36 substantially blocks passage through the aperture 36a of diffused light, while allowing passage therethrough of reflected modulated light from the light valve 35.

After passing through the aperture 36a, the modulated light flux diverges and is reflected by the mirror 33 (preferably planar) toward the rear lens system 37. The rear lens system has an optical axis B that extends, via the mirror 33, through the focal point 36b. The mirror 33 is oriented such that the modulated light flux reflected therefrom passes through a substantially central region of the rear lens system 37 where the optical properties are best; thus, asymmetric aberrations such as coma that could be introduced to the modulated light flux by the rear lens system 37 are minimized.

Exemplary System Components

A preferred illumination source 31 is a metal halide lamp with a light emitter that is approximately 5 mm long along the central axis 39. Of course, any number of alternative illumination sources, such as a xenon lamp, capable of providing a substantially point source of light will work equally as well.

As discussed above, preferred light valves for use according to this invention include those having reflective screens constructed to form images using reflected illumination light. Such preferred light valves can have any of a wide variety of constructions, including screens using oil films, metallic films, cantilevered valve structures, and electro-optical crystal structures such as liquid crystals. The optical efficiency of polarization-type light valves can also be improved under the present invention.

Various known condenser and projection lens assemblies can be utilized as the front lens system 34 and the rear lens system 37, respectively. It will be understood that the depiction in FIGS. 3 and 4 of a single lens element in each of the front and rear lens systems is for ease of illustration and is not to be construed as limiting in any way. Actual front and rear lens systems can each comprise plural lens elements.

It is pointed out that the orientations of the light valve 35 and other components shown in FIGS. 3 and are exemplary only and are not intended to be limiting in any way. The projection system 30 can have any of various orientations appropriate for projecting an image on a suitable surface such as a ceiling or vertical wall in a dwelling.

While the present invention has been described in connection with the preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A projection system, comprising:
   (a) a light source operable to produce a light-source image and an illumination light flux propagating from the light-source image;
   (b) a light valve situated such that the illumination light flux can be incident on the light valve, the light valve being operable to convert the incident illumination light flux into a modulated light flux propagating from the light valve;
   (c) a front lens system having a front optical axis, and a screen-side focal surface on which the light-source image is situated, the front lens system being situated relative to the light-source image and the light valve so as to cause the illumination light flux from the light-source image to be incident on the light valve and to refract the modulated light flux from the light valve to propagate on a propagation axis parallel to the front optical axis to converge on the screen-side focal surface of the front lens system;
   (d) a stop defining an aperture concentric with the converged modulated light flux on the screen-side focal surface;
   (e) a rear lens system having a rear optical axis, the rear lens system being situated relative to the front lens system so as to transmit the modulated light flux propagating from the aperture to a projection screen; and
   (f) a mirror disposed so as to reflect the modulated light flux, divergently propagating from the aperture, to the rear lens system.

2. The projection system of claim 1, further comprising a mirror disposed so as to reflect the illumination light flux from the light source through the front lens system toward the light valve.

3. The projection system of claim 2, wherein the illumination light from the light-source converges on the mirror.

4. The projection system of claim 1, wherein the rear lens system is situated relative to the aperture such that the modulated light flux is transmitted through a substantially central region of the rear lens system.

5. A projection system, comprising:
   (a) a light source operable to produce a light-source image and an illumination light flux propagating from the light-source image;
   (b) a light valve situated such that the illumination light flux can be incident on the light valve, the light valve being operable to convert the incident illumination light flux into a modulated light flux propagating from the light valve;
   (c) a front lens system having a front optical axis, and a screen-side focal surface on which the light-source image is situated, the front lens system being situated relative to the light-source image and the light valve so as to cause the illumination light flux from the light-source image to be incident on the light valve and to refract the modulated light flux from the light valve to propagate on a propagation axis parallel to the front optical axis to converge on the screen-side focal surface of the front lens system;
   (d) a stop defining an aperture concentric with the converged modulated light flux on the screen-side focal surface; and
   (e) a rear lens system having a rear optical axis, the rear lens system being situated relative to the front lens system so as to transmit the modulated light flux propagating from the aperture to a projection screen, wherein the front lens system is situated relative to the light valve and the light-source image such that the illumination light flux and the modulated light flux are transmitted through an eccentric area of the front lens system.

6. The projection system of claim 1, wherein the rear lens system is situated relative to the aperture such that the modulated light flux is transmitted through a substantially central region of the rear lens system.

7. The projection system of claim 1, wherein the aperture is coaxial with the rear optical axis.

8. The projection system of claim 1, wherein the front lens system refracts the incident light flux so as to be incident on the light valve as a substantially collimated light flux.

9. The projection system of claim 1, wherein the modulated light flux propagates from the light valve to the first lens system as substantially parallel rays.

10. The projection system of claim 1, further comprising a projection screen disposed relative to the rear lens system so as to receive the modulated light flux transmitted by the rear lens system and form a viewable image from the modulated light flux.

11. The projection system of claim 1, wherein the light source comprises a point source of light and an ellipsoidal mirror, the point source being located at a first focal point of the ellipsoidal mirror and the light-source image being located at a second focal point of the ellipsoidal mirror.

12. A projection system, comprising:
   (a) a point-light source operable to form a light-source image;
   (b) a light valve;
   (c) a stop defining an aperture;
   (d) a front lens system having a front optical axis and defining a screen-side focal surface;
   (e) a rear lens system having a rear optical axis, wherein the light source, light valve, aperture, and front and rear lens systems are disposed relative to each other such that light emitted by the light source, after forming the light-source image and then passing through the front lens system, is directed to the light valve with a substantially parallel light flux, is reflected by the light valve and, after passing through the front lens system and the rear lens system, is directed onto a viewing screen, wherein the light-source image and the aperture are situated on the screen-side focal surface of the front lens system, and the light passing from the light valve through the front lens system propagates from the front lens system along a propagation axis that is parallel to the front optical axis; and (f) a mirror disposed so as to reflect the modulated light flux, divergently propagating from the aperture, to the rear lens system.

13. A projection system, comprising:

(a) a light source operable to produce an illumination light flux and to converge the illumination light flux to form a light-source image;

(b) a light valve operable to convert the illumination light flux incident on the light valve into a modulated light flux;

(c) a front lens system having a front optical axis and defining a screen-side focal surface on which the light-source image is formed and through which the front optical axis passes, the front lens system being disposed relative to the light source and the light valve so as to direct the illumination light flux, propagating from the light-source image, to be incident at an angle $\theta_i$ on the light valve, and disposed relative to the light valve and the projection screen so as to direct the modulated light flux at an angle $\theta_r$ from the light valve toward a projection screen;

(d) a rear lens system having a rear optical axis, the rear lens system being disposed relative to the front lens system so as to direct the modulated light flux from the front lens system onto the projection screen;

(e) a stop defining an aperture located on the screen-side focal surface on an opposite side of the front optical axis, the front lens system being operable to converge the modulated light flux at a point concentric with the aperture;

(f) a mirror disposed so as to reflect the modulated light flux, divergently propagating from the aperture, to the rear lens system; and (g) the front lens system being disposed between the light valve and the aperture, and the rear lens system being disposed between the aperture and the projection screen.

14. A projection system, comprising:

(a) a light source operable to produce a light-source image and an illumination light flux propagating from the light-source image;

(b) a light valve situated such that the illumination light flux can be incident on the light valve, the light valve being operable to convert the incident illumination light flux into a modulated light flux propagating from the light valve;

(c) a front lens system having a screen-side focal surface on which the light-source image is situated, the front lens system being situated relative to the light-source image and the light valve so as to cause the illumination light flux from the light-source image to be incident on the light valve and to refract the modulated light flux from the light valve to converge on a screen-side focal surface of the front lens system;

(d) a stop defining an aperture concentric with the converged modulated light flux on the screen-side focal surface;

(e) a rear lens system situated relative to the front lens system so as to transmit the modulated light flux propagating from the aperture to a projection screen; and (f) the front lens system being situated relative to the light valve and the light-source image such that the illumination light flux and the modulated light flux are transmitted through an eccentric area of the front lens system.

15. The projection system of claim 14, wherein the rear lens system is situated relative to the aperture such that the modulated light flux is transmitted through a substantially central region of the rear lens system.

* * * * *

UNITED STATES PATENT AND TRADEMARK OFFICE
CERTIFICATE OF CORRECTION

PATENT : 5,839,808
DATED : November 24, 1998
INVENTOR(S) : Koyama et al.

It is certified that error appears in the above-identified patent and that said Letters Patent is hereby corrected as shown below:

On the title page, item [75] Inventors, insert -- Kuniharu Takizwa, Hiroshi Kikuchi and Masahiro Kawakita.

Signed and Sealed this

Fourteenth Day of September, 1999

Attest:

Q. TODD DICKINSON

Attesting Officer    Acting Commissioner of Patents and Trademarks

UNITED STATES PATENT AND TRADEMARK OFFICE
CERTIFICATE OF CORRECTION

PATENT : 5,839,808

DATED : November 24, 1998

INVENTOR(S) : MotooKoyama, et al.

It is certified that error appears in the above-identified patent and that said Letters Patent is hereby corrected as shown below:

On the title page, in item [73], the second assignee's name should be corrected to read: --Nippon Hoso Kyokai--.

Signed and Sealed this

Twenty-first Day of December, 1999

*Attest:*

Q. TODD DICKINSON

*Attesting Officer*  *Acting Commissioner of Patents and Trademarks*